United States Patent [19]

Reasoner

[11] Patent Number: 5,178,034
[45] Date of Patent: Jan. 12, 1993

[54] AUTOMATIC ADJUST ASSEMBLY WITH RELEASE PIN

[75] Inventor: Michael V. Reasoner, Davison, Mich.

[73] Assignee: Teleflex Incorporated, Limerick, Pa.

[21] Appl. No.: 844,438

[22] Filed: Mar. 2, 1992

[51] Int. Cl.⁵ .............................................. F16C 1/22
[52] U.S. Cl. ............................... 74/502.6; 74/501.5 R
[58] Field of Search ............... 74/501.5 R, 502, 502.4, 74/502.6

[56] References Cited

U.S. PATENT DOCUMENTS

| | | | |
|---|---|---|---|
| 3,036,350 | 5/1962 | Hunt | 74/501.5 X |
| 4,177,691 | 12/1979 | Fillmore | 74/502.4 |
| 4,331,041 | 5/1982 | Bennett | 74/501.5 R |
| 4,418,583 | 12/1983 | Taig | 74/501.5 R |
| 4,598,809 | 7/1986 | Glover et al. | 192/111 A |
| 4,658,668 | 4/1987 | Stocker | 74/501.5 R |
| 4,669,330 | 6/1987 | Stocker | 74/501.5 R |
| 4,694,706 | 9/1987 | Lichtenberg et al. | 74/501.5 R |
| 4,798,100 | 1/1989 | Baumgarten | 74/501.5 R |
| 4,841,806 | 6/1989 | Spease | 74/501.5 R |
| 4,854,185 | 8/1989 | Lichtenberg et al. | 74/501.5 R |
| 4,869,123 | 9/1989 | Stocker | 74/501.5 R |
| 4,903,541 | 2/1990 | Shiota | 74/501.5 R |
| 4,936,161 | 6/1990 | Polando | 74/502.6 |
| 4,969,372 | 11/1990 | Muhlecker et al. | 74/501.5 R |
| 5,039,138 | 8/1991 | Dickirson | 285/314 |

Primary Examiner—Richard Lorence
Attorney, Agent, or Firm—Reising, Ethington, Barnard, Perry & Milton

[57] ABSTRACT

A motion transmitting remote control assembly (10) of the type for transmitting motion along a curved path by a flexible motion transmitting core element (14) movably supported within a tubular conduit (12) includes a first (18) and second (20) conduit section axially moveably disposed with respect to one another. A release pin (106) is disposed between the first (18) and second (20) conduit sections for maintaining the first (18) and second (20) conduit sections in a minimum length position while the assembly is shipped and installed. A compression spring (82) reacts between the first (18) and second (20) conduit sections for automatically urging the first (18) and second (20) conduit sections to a maximum length position upon removal of the release pin (106). A locking clip (86) maintains the assembly in the adjusted position.

24 Claims, 3 Drawing Sheets

AUTOMATIC ADJUST ASSEMBLY WITH RELEASE PIN

TECHNICAL FIELD

The subject invention relates to a motion transmitting remote control assembly of the type for transmitting motion along a curved path by a flexible motion transmitting core element movably supported by a flexible conduit.

BACKGROUND OF THE INVENTION

Motion transmitting remote control assemblies for transmitting motion in a curved path are used in aircraft, automotive, and marine environments. A typical use of such remote control assemblies is the positioning of throttle members in automobiles. In general these assemblies include a flexible tubular conduit movably supporting a flexible motion transmitting core element with two ends.

In such applications, it is frequently desirable to adjust the length or position of the end of the core element once the assembly has been installed. Such assemblies normally include one or more fittings secured to the conduit for attaching the conduit to a support structure of the automobile. The core element is adapted at one end to be attached to a member to be controlled whereas the other end is attached to a manual actuator for longitudinally moving the core element. After the assembly has been installed, the position of the actuator must be adjusted to correspond with the position of the member to be controlled so that both the actuator and member to be controlled reach their terminal end stroke positions at exactly the same time, and so that there is no slack, or play, between them. This is accomplished by either adjusting the length of the core element or the length of the conduit, as is well known in the art.

In some applications it is necessary for the adjustment to be accomplished automatically due either to space constraints within the installation area or time constraints during installation. Therefore, during shipping and installation the assembly must be maintained in a position that will allow maximum automatic length adjustment, if needed, utilizing a biasing means at the appropriate time during installation. This requires that the biasing means be secured during installation utilizing a securing means. After length adjustment, the assembly must be locked in the adjusted position utilizing a locking means. Preferably, the locking means is not used as the securing means during shipping and installation since the locking means is designed not to be easily disengaged.

One example of a prior art adjustment assembly is shown in U.S. Pat No. 4,177,691 to Fillmore, issued Dec. 11, 1979 and assigned to the assignee of the subject invention. This reference discloses a conduit adjust assembly including a biasing means and a locking means to maintain the length adjustment. It does not disclose a separate securing means. Another example of a prior art adjust assembly is shown in U.S. Pat. No. 3,036,350 to Hunt issued May 29, 1962. This reference discloses a core length adjust assembly including a locking means which also functions as a securing means and a locking pin to maintain the length adjustment. However, the locking pin must be manually inserted into aligned apertures to lock and relock, a time consuming operation.

U.S. Pat. No. 4,798,100 to Baumgarten, issued Jan. 17, 1989, discloses a securing means to secure the adjust assembly prior to installation. However, the securing means includes a twist ring which does not always release easily. Further, the securing means includes interlocking projections and notches increasing the cost of tooling and production of the assembly.

SUMMARY OF THE INVENTION AND ADVANTAGES

According to the present invention, there is provided a motion transmitting remote control assembly of the type for transmitting motion along a curved path by a flexible motion transmitting core element movably supported within a tubular conduit. The conduit includes a first and second conduit section extending along a central axis and arranged in end-to-end fashion. The first and second conduit sections are axially moveably disposed with respect to one another. A plurality of adjustment teeth are spaced axially along the first conduit section. A locking means is supported on the second conduit section and is selectively movable between an engagement position with the adjustment teeth for selectively locking the first conduit section to the second conduit section in one of several adjusted positions and a disengaged position disengaged from the adjustment teeth for allowing adjustment between a minimum length position and a maximum length position of the conduit. A biasing means reacts between the first and second conduit sections for urging the first and second conduit sections to the maximum length position. The invention is characterized by securing means which is disposed between the first and second conduit sections and spaced from the locking means for maintaining the first and second conduit sections in the minimum length position while the locking means remains disengaged from the adjustment teeth and for automatically allowing the first and second conduit sections to move toward the maximum length position while the locking means remains disengaged from the adjustment teeth to automatically remove slack in the first and second conduit sections prior to engaging the locking means with the adjustment teeth.

Accordingly, the securing means of the present invention in combination with the biasing means permits the assembly to be shipped and installed in the minimum length position and then to automatically adjust the position of the first and second conduit. The securing means of the present invention is simply designed, easy to manufacture and install, as well as easily released.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
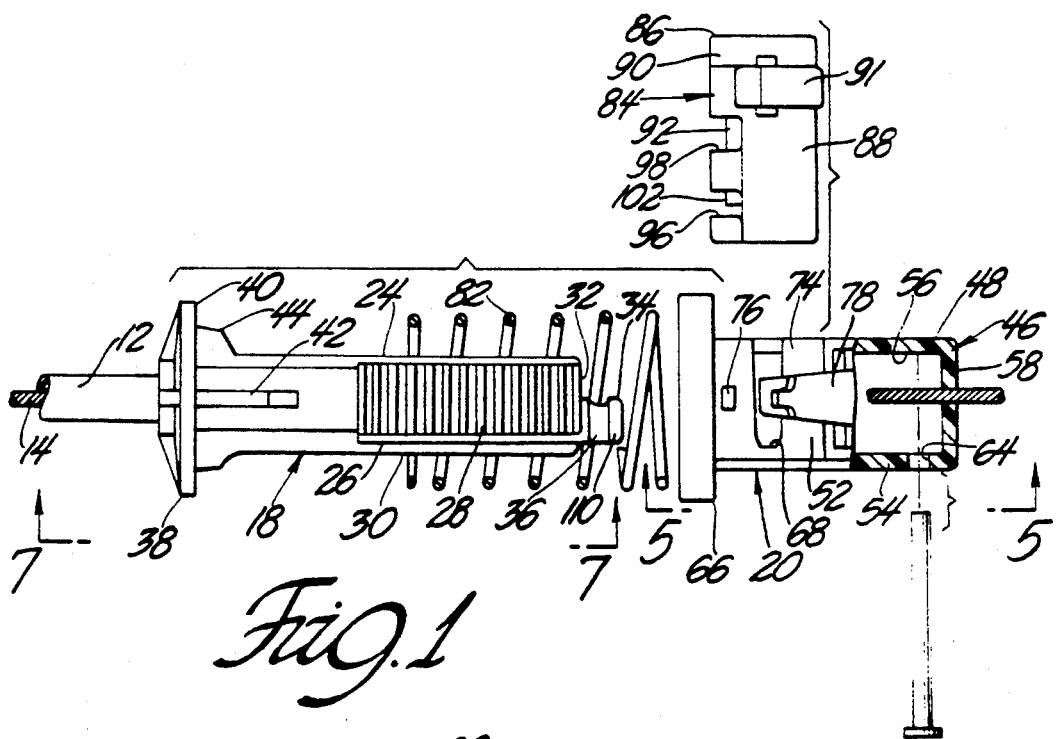
FIG. 1 is an exploded view of the preferred embodiment of the assembly.

Referring now to FIGS. 1-8, the preferred embodiment of a motion transmitting remote control assembly constructed in accordance with the instant invention is generally shown at 10. The assembly 10 includes a tubular conduit 12 and a flexible motion transmitting core element 14 which is moveably supported by the tubular conduit 12. The tubular conduit 12 has a length and a central axis 16. The core element 14 has a length and a central axis, with the axes of the conduit 12 and core element 14 being generally coincidental, and, for all practical purposes, the same axis 16. The tubular conduit 12 is preferably of the known type utilized in remote control assemblies including an inner tubular member over an organic polymeric material surrounded by a plurality of filaments or long lay wires disposed on a long lead and encased in an outer jacket of organic polymeric material. The organic polymeric material may be of the various known plastics such as polyethylene, etc.

The tubular conduit 12 has a first and second conduit section, generally indicated at 18 and 20, respectively. The first 18 and second 20 conduit sections are arranged in end-to-end fashion and axially moveably disposed with respect to one another for allowing adjustment between a minimum length position and a maximum length position of the conduit 12. In other words, telescopic relative movement between the first 18 and second 20 conduit sections is allowed to adjust the length of the conduit 12 relative to the core element 14. This allows the position of an actuator (not shown) to be adjusted to correspond with the position of a member to be controlled (not shown) so that both the actuator and member to be controlled reach their terminal end stroke positions at exactly the same time, and so that there is no slack, or play, between them.

The flexible motion transmitting core element 14 is moveably supported along the central axis 16 within each of the first 18 and second 20 conduit sections. The first 18 and second 20 conduit sections are preferably of organic polymeric material and may be formed using injection molding techniques.

Figure 7:
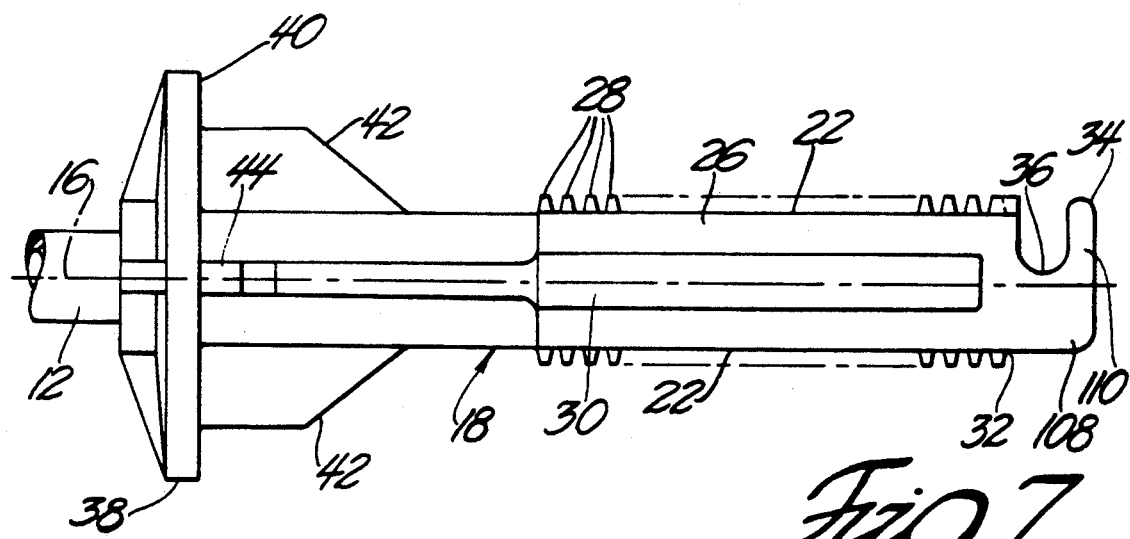
FIG. 7 is a side view of the first conduit end taken along lines 7—7 of FIG. 1.

As shown in FIGS. 1 and 7, the first conduit section 18 is elongated at one end and includes oppositely facing parallel side walls 22 extending longitudinally of the central axis 16 and a pair of oppositely facing parallel first 24 and second 26 connecting surfaces extending between and connecting the side walls 22. Disposed on the side walls 22 are a plurality of incrementally spaced adjustment teeth 28 which extend vertically between the first 24 and second 26 connecting surfaces. An alignment rib 30 is disposed on the second connecting surface 26 extending longitudinally of the central axis 16.

An end 32 of the first conduit section 18 is formed adjacent to the sidewalls 22 and the first 24 and second 26 connecting surfaces. Extending from the end 32 is a hook 34 which forms a socket 36. The hook 34 extends transversely between the axis 16 and second connecting surface 26, as best shown in FIG. 1. The hook 34 therefore is noncentered or offsettingly disposed on the end 32. A flange 38 extends outwardly from the first conduit section 18 and is spaced from the sidewalls 22, first 24 and second 26 connecting surfaces, and the end 32. The flange 38 includes a seating surface 40 adjacent to the first conduit section 18. At least one strengthening rib 42 extends longitudinally from the seating surface 40 of the flange 38 along the first conduit section 18. Further, a pair of fins 44 are disposed on the first conduit section 18 and extend outwardly adjacent to the seating surface 40.

Figure 5:
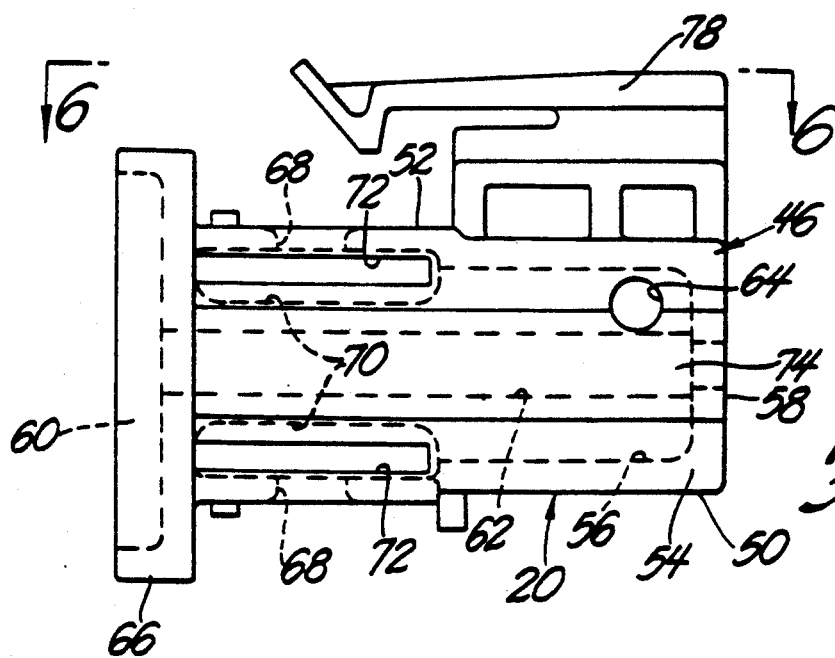
FIG. 5 is a bottom view of the housing as taken along lines 5—5 of FIG. 1.
Figure 6:
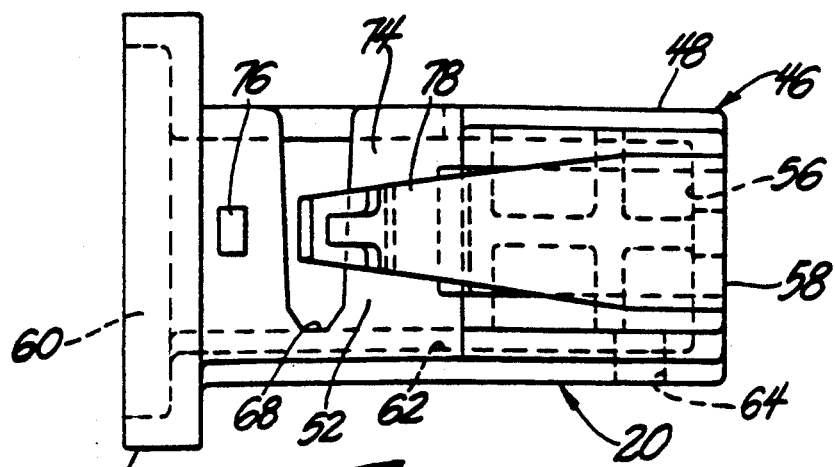
FIG. 6 is a side view of the housing as taken along lines 6—6 of FIG. 5.

As best shown in FIGS. 1, 5 and 6, the second conduit section 20 includes a housing generally indicated at 46. The housing 46 includes a roof 48, a pair of first and second lateral walls 50,52 spaced from one another and extending downwardly from the roof 48. A floor 54 is spaced from the roof 48 and interconnects the first 50 and second 52 lateral walls thereby forming a housing receptacle 56 for slideably receiving the first conduit section 18. The housing 46 also includes a closed end 58 and an open end 60 with the housing receptacle 56 extending therebetween. The first conduit section 18 is received in the housing receptacle 56 through the open end 60.

The housing receptacle 56 includes an alignment groove 62 disposed on the floor 54 which extends longitudinally of the central axis 16 for receiving the alignment rib 30 disposed on the second connecting surface 26 of the first conduit section 18 to orientate the first conduit section 18 within the housing receptacle 56. This serves to orientate the first conduit section 18 within the housing receptacle 56 such that the first 24 and second 26 connecting surfaces are disposed adjacent and parallel to the roof 48 and floor 54, respectively, of the housing 46. The adjustment teeth 28 disposed on the sidewalls 22 are disposed spaced from the first 50 and second 52 lateral walls. The housing 46 further includes a transverse hole 64 which extends through the floor 54 of the housing 46 and is spaced between the alignment groove 62 and the first lateral wall 50 and is adjacent to the closed end 58. A lip 66 is disposed about the open end 60 of the housing 46.

The housing 46 further includes a vertical receiving slot 68 extending transverse to the central axis 16 and through each of the first 50 and second 52 lateral walls. The receiving slot 68 is disposed adjacent to the open end 60. The vertical receiving slots 68 extend from the roof 48 to a termination point adjacent to the floor 54 of the housing 46. The housing 46 includes a pair of roof slots 70 disposed through the roof 48 of the housing 46 and extending longitudinally of the central axis 16. The roof slots 70 are disposed adjacent to the vertical receiving slots 68. The housing 46 also includes a pair of floor slots 72 disposed through the floor 54 of the housing 46. The floor slots 72 are spaced between the alignment groove 62 and the first 50 and second 52 lateral walls.

The housing 46 has an external surface 74. A detent 76 is disposed on the external surface 74 of the first 50 and second 52 lateral walls and is spaced between the vertical receiving slots 68 and the lip 66. A fitting 78 is disposed on the external surface 74 of the housing 46 and is adapted for attachment to a support structure (not shown). The fitting 78 is clip-like and slips into a holding slot and over a ridge into a first arm of an L-shaped slot in the support structure.

Biasing means, generally indicated at 80, is provided for allowing automatic adjustment between a minimum length position and a maximum length position of the conduit 12. The biasing means 80 is maintained in a minimum length position during installation. After installation the biasing means 80 is released to automatically react between the first 18 and second 20 conduit sections to urge the first conduit section 18 slidably disposed within the housing receptacle 56 to a correctly adjusted position. After adjustment, the first 18 and second 20 conduit sections are manually locked into the adjusted position.

More particularly, the biasing means 80 includes a compression spring 82 disposed between the first 18 and second 20 conduit sections for automatically urging the first 18 and second 20 conduit sections to move toward the maximum length position. The compression spring 82 is seated in the lip 66 disposed on the second conduit section 20 and on the seating surface 40 of the flange 38 disposed on the first conduit section 18. The fins 44 extending outwardly adjacent to the seating surface 40 prevents lateral movement of the compression spring 82 on the seating surface 40.

Thus, after the biasing means 80 is released, the compression spring 82 reacts between the flange 38 and the lip 66 to urge the second conduit section 20 to the end 32 of the first conduit section 18 thereby creating a lengthening effect for the overall conduit 12. This, in turn, causes the slack in the core element 14 to be taken up so that both the actuator and member to be controlled reach their terminal end stroke positions at exactly the same time.

Once the slack in the core element 14 and/or conduit 12 has been eliminated, the first 18 and second 20 conduit sections must be locked in the newly adjusted position. To manually lock the first 18 and second 20 conduit sections into the newly adjusted position, a locking means, generally indicated at 84, is provided. The locking means 84 is supported on the housing 46 and received in the vertical receiving slot 68. The locking means 84 is selectively movable between an engagement position with the adjustment teeth 28 for selectively locking the first conduit section 18 to the second conduit section 20 in one of several adjusted positions and a disengaged position disengaged from the adjustment teeth 28 for allowing adjustment between a minimum length position and a maximum length position of the conduit 12. Therefore, once the slack in the conduit 12 and/or core element 14 has been eliminated by action of the biasing means 80, the locking means 84 is actuated to retain the first 18 and second 20 conduit sections in the adjusted position.

Figure 8:
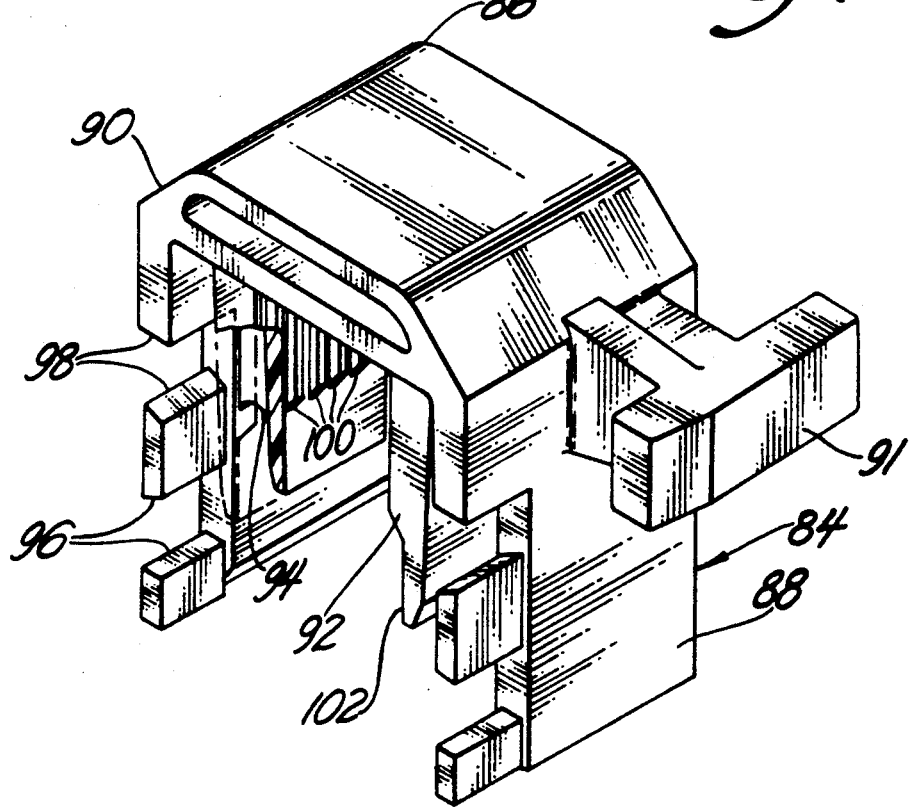
FIG. 8 is an enlarged, perspective view of the locking clip.

More particularly, the locking means 84 includes a U-shaped clip 86 as best shown in FIG. 8, which includes a pair of vertical outer walls 88 with a crosspiece 90 extending between each of the outer wall 88 to form the generally U-shaped clip 86. Extending from one of the outer walls 88 is a T-shaped fastener 91 and is adapted for attachment to the support structure (not shown) on which the fitting 78 is clipped. The T-shaped fastener 91 slides thru a second arm of the L-shaped slot in the support structure when the fitting 78 is clipped to the support structure. Parallel and spaced inwardly from each outer wall 88 is an inner wall 92. The inner walls 92 are therefore disposed between the outer walls 88. A connecting rib 94 connects each inner wall 92 to its corresponding outer wall 88. When the clip 86 is disposed on the housing 46, the outer walls 88 are adjacent to the external surface 74 of the housing 46 and the inner walls 90 are received by the roof slots 70. The inner walls 90 therefore extend into the housing receptacle 56 and are spaced between the sidewalls 22 of the first conduit section 18 and the first 50 and second 51 lateral walls of the housing 46. The connecting rib 94 is slidably disposed in the vertical receiving slots 68.

Figure 3:
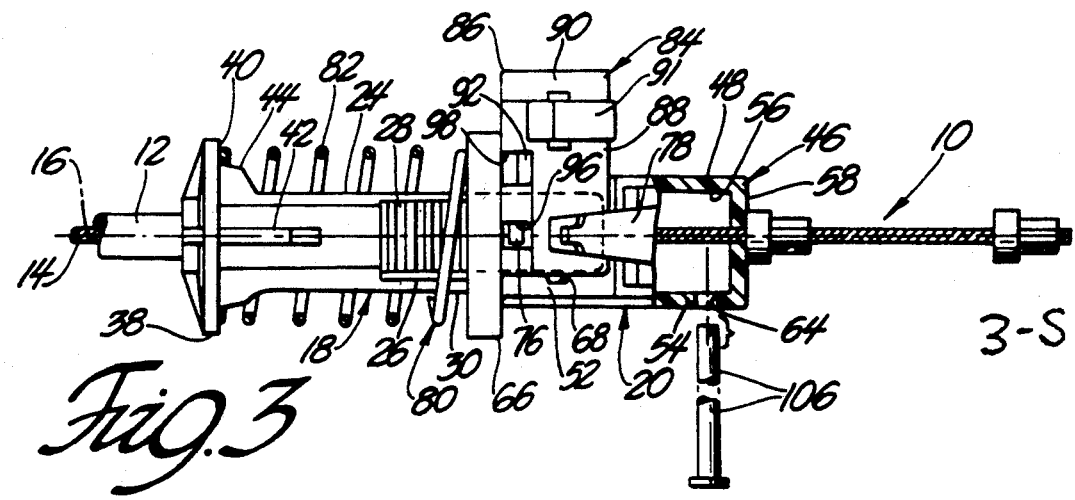
FIG. 3 is a side view as in FIG. 1 showing the release pin removed and the first conduit section moved toward the maximum length position with the locking means disengaged from the adjustment teeth.
Figure 4:
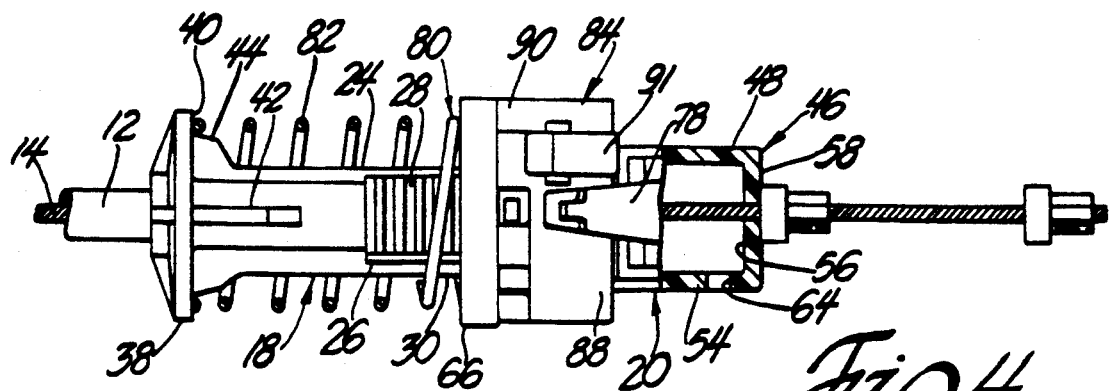
FIG. 4 is a side view of the assembly with the first conduit section moved toward the maximum length position and the locking means engaged with the adjustment teeth.

The clip 86 further includes a lower notch 96 and an upper notch 98 disposed on each of the outer walls 88 for receiving the detent 76 disposed on the housing 46 as the clip 86 moves in the vertical receiving slot 68. The upper notch 98 is spaced vertically from the lower notch 96 and is adjacent to the crosspiece 90, that is it is between the lower notch 96 and crosspiece 90. The locking means 84 is in the disengaged position when the clip 86 is disposed on the housing 46 such that the detent 76 is in the lower notch 96. The upper notch 98 is spaced above the roof 48 of the housing 46 in the disengaged position as shown in FIG. 3. The locking means 84 is in the engaged position when the clip 86 is manually urged downwardly on the housing 46 such that the detent 76 is in the upper notch 98 and the crosspiece 90 is adjacent to the roof 48 of the housing 46 as best shown in FIG. 4. The lower notch is then even with the floor 54 of the housing 46 in the engaged position. As the clip 86 is manually urged downwardly the T-shaped fastener 91 engages the support structure (not shown) to which the fitting 78 is clipped. As the clip 86 is manually urged downwardly the T-shaped fastener 91 moves downwardly into the first arm of the L-shaped slot in the support structure and in which the fitting 78 is clipped.

Figure 2:
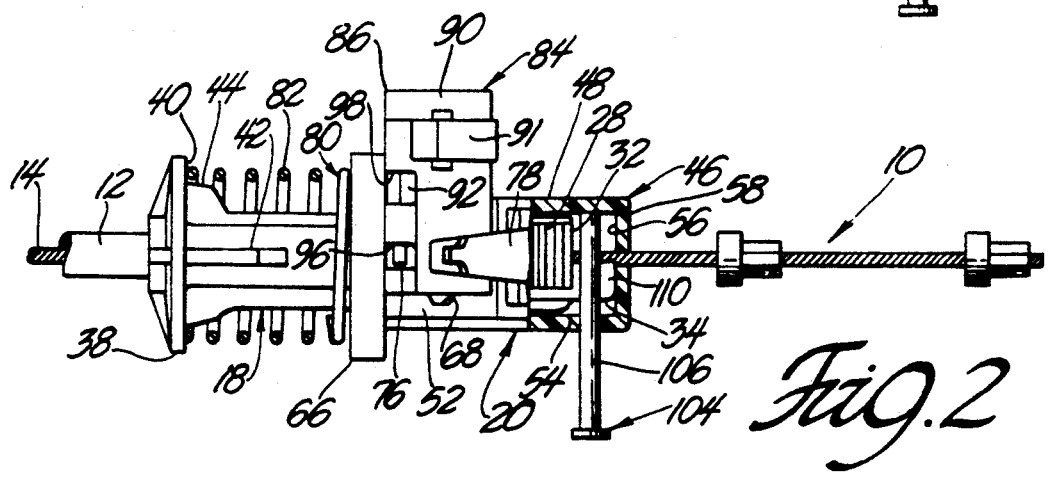
FIG. 2 is a side view of the assembly shown in partial cross section secured in the minimum length position with the locking means disengaged from the adjustment teeth.

The clip 86 includes a plurality of locking teeth 100 disposed on the inner walls 92, extending longitudinally of the central axis 16, and parallel to the upper notches 98. The locking teeth 100 extend out from the inner wall 92 into the housing receptacle 56 to engage the adjustment teeth 28 in the engagement position to selectively lock the first conduit section 18 to the second conduit section 20 in one of several adjusted positions. In the disengaged position, the locking teeth 100 are disposed above the housing 46, as best shown in FIGS. 2 and 3. Therefore, when the clip 86 is urged downwardly onto the housing 46, the locking teeth 100 are brought into engagement with the adjustment teeth 28.

Each inner wall 92 includes at least one guide 102, extending longitudinally of the central axis 16, and extending transversely downwardly toward the floor 54 of the housing 46 from the locking teeth 100 and parallel to the lower notches 96 for guiding the first conduit section 18 in the housing receptacle 56 when the locking means 84 is in the disengaged position. The guide 102 is disposed spaced between the adjustment teeth 28 and the first 50 and second 52 lateral walls in the disengaged position. The locking teeth 100 extend further from the inner wall than the guide 102, thus providing an internally stepped, or offset, appearance as shown in FIG. 8. The locking teeth 100 and guides 102 are therefore laterally offset relative to the central axis 16. The housing 46 floor slots 72 receive the guides 102 in the engaged position.

Securing means, generally indicted at 104, is disposed between the first 18 and second 20 conduit sections and spaced from the locking means 84 for maintaining the first 18 and second 20 conduit sections in the minimum length position while the locking means 84 remains disengaged from the adjustment teeth 28. Therefore, the locking means 84 is not used for securing the assembly 10 during shipping and is only engaged after the slack in the conduit 12 and/or core element 14 has been eliminated by action of the biasing means 80.

Further, the securing means 104, upon release, allows the first 18 and second 20 conduit sections to automatically move under the influence of the compression spring 82 toward the maximum length position while the locking means 84 remains disengaged from the adjustment teeth 28. For release, the securing means 104 is removed to allow the slack to be automatically removed in the first 18 and second 20 conduit sections prior to engaging the locking means 84 with the adjustment teeth 28. Thus, the securing means 104 restrains the biasing means 80 in a minimum length position during shipping and installation of the assembly 10.

The securing means 104 includes the hook 34 offsettingly disposed on the end 32 of the first conduit section 18, the socket 36 formed by the hook 34, and the transverse hole 64 extending through the floor 54 of the housing 46. The securing means 104 also includes a release pin 106. In the minimum length position, the socket 36 formed by the hook 34 is aligned with the transverse hole 64.

To align the socket 36 and the transverse hole 64 in the minimum length position, the end 32 of the first conduit section 18 is inserted into the housing receptacle 56, with the locking means 84 in the disengaged position such that the alignment rib 30 disposed on the second connecting surface 26 is slidably disposed within the alignment groove 62 disposed on the floor 54 to orientate the first conduit section 18 within the housing receptacle 56. The first 24 and second 26 connecting surfaces of the orientated first conduit section 18 are disposed parallel and adjacent to the roof 48 and floor 54, respectively, of the housing 46. The adjustment teeth are disposed spaced from the guides 102. The first conduit section 18 is then inserted into the housing receptacle 56 until the hook 34 is disposed adjacent to the closed end 58 of the housing 46.

The hook 34 includes a straight segment 108 extending outwardly from the end 32 and a bent segment 110 extending from the straight segment 108 at an approximate 90° angle and spaced from the end 32. The bent piece 110 extends towards one of the sidewalls 22. Therefore, the straight segment 108 and the bent segment 110 and the end 32 form the socket 36 such that the socket 36 opens toward the side wall 22. In other words, the socket 36 extends transversely to the second connecting surface 26 and therefore transverse to the floor 54 of the housing 46. The core element 14 as it extends through the first conduit section 18 passes over the straight segment 108 of the hook 34. To guide the core element 14 over the straight segment 108, the bent segment 110 extends slightly higher than the straight segment 108 presenting a stepped appearance as best seen in FIG. 2, with the core element 14 therefore being guided along the bent segment 110.

The release pin 106 is disposed through the transverse hole 64 and received in the socket 36 when the first 18 and second 20 conduit sections are adjusted in the minimum length position. Thus, the first 18 and second 20 conduit sections are secured in the minimum length position prior to automatic adjustment.

During fabrication of the assembly 10, the release pin 106 is inserted utilizing a standard press, as well known to those skilled in the art. After installation of the assembly 10, the release pin 106 is removed utilizing a pair of pliers or the like and thrown away. Thus, automatic length adjustment from the minimum length position toward the maximum length adjustment is allowed while the locking means 84 is in the disengaged position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting motion along a curved path by a flexible motion transmitting core element (14), said assembly (10) comprising:

a tubular conduit (12) extending along a central axis (16) thereof and having first (18) and second (20) conduit sections arranged in end-to-end fashion and axially moveably disposed with respect to one another;

a flexible motion transmitting core element (14) movably supported along said central axis (16) within each of said first (18) and second (20) conduit sections;

a plurality of adjustment teeth (28) spaced axially along said first conduit section (18);

locking means (84) supported on said second conduit section (20) and selectively movable between an engagement position with said adjustment teeth (28) for selectively locking said first conduit section (18) to said second conduit section (20) in one of several adjusted positions and a disengaged position disengaged from said adjustment teeth (28) for allowing adjustment between a minimum length position and a maximum length position of said conduit (12);

biasing means (80) reacting between said first (18) and second (20) conduit sections for urging said first (18) and second (20) conduit sections to said maximum length position;

and characterized by securing means (104) disposed between said first (18) and second (20) conduit sections and spaced from said locking means (84) for maintaining said first (18) and second (20) conduit sections in said minimum length position while said locking means (84) remains disengaged from said adjustment teeth (28) and for automatically allowing said first (18) and second (20) conduit sections to move toward said maximum length position while said locking means (84) remains disengaged from said adjustment teeth (28) to automatically remove slack in said first (18) and second (20) conduit sections prior to engaging said locking means (84) with said adjustment teeth (28).

2. An assembly (10) as set forth in claim further characterized by said second conduit section (20) including a housing (46) matingly slideably receiving a portion of said first conduit section (18) for movement between said minimum length position and said maximum length position of said conduit (12).

3. An assembly (10) as set forth in claim 2 further characterized by said securing means including a socket (36) disposed in said first conduit section (18) and a transverse hole (64) extending through said housing (46)

and aligned with said socket (36) when in said minimum length position.

4. An assembly (10) as set forth in claim 3 further characterized by said securing means (104) including a release pin (106) disposed through said transverse hole (64) and received in said socket (36) when said first (18) and second (20) conduit sections are disposed in said minimum length position.

5. An assembly (10) as set forth in claim 4 further characterized by said biasing means (80) including a compression spring (82) disposed between said first (18) and second (20) conduit sections for automatically urging said first (18) and second (20) conduit sections toward said maximum length position.

6. An assembly (10) as set forth in claim 5 further characterized by said first conduit section (18) including a flange (38) extending outwardly from said first conduit section (18) for seating said compression spring (82).

7. An assembly (10) as set forth in claim 6 wherein said flange (38) includes a seating surface (40) disposed adjacent said first conduit section (18), further characterized by said first conduit section (18) including a pair of fins (44) disposed on said first conduit section (18) and extending outwardly adjacent to said seating surface (40) for preventing lateral movement of said compression spring (82).

8. An assembly (10) as set forth in claim 1 further characterized by said first conduit section (18) including oppositely facing parallel side walls (22) extending longitudinally of said central axis (16), with said adjustment teeth (28) being disposed along each of said side walls (22).

9. An assembly (10) as set forth in claim 8 wherein said first conduit section (18) includes a pair of opposite facing parallel first (24) and second (26) connecting surfaces extending between said side walls (22), further characterized by an alignment rib (30) disposed on said second connecting surface (26) and extending longitudinally of said central axis (16).

10. An assembly (10) as set forth in claim 9 wherein said first conduit section (18) includes a hook (34) extending from an end (32) of said first conduit section (18) defining said socket (36).

11. An assembly (10) as set forth in claim 2 further characterized by said housing including a roof (48), a pair of first (50) and second (52) lateral walls spaced from one another and extending downwardly from said roof (48), a floor (54) spaced from said roof (48) and interconnecting said first (50) and second (52) lateral walls and forming a housing receptacle (56) for slideably receiving said adjustment teeth (28) of said first conduit section (18).

12. An assembly (10) as set forth in claim 11 further characterized by said housing (46) including a closed end (58) and an open end (60) with said housing receptacle (56) extending therebetween and a lip (66) encircling said open end (60) for seating said compression spring (82).

13. An assembly (10) as set forth in claim 12 further characterized by said housing (46) including an alignment groove (62) disposed on said floor (54) extending longitudinally of said central axis (16) for receiving said alignment rib (30).

14. An assembly (10) as set forth in claim 13 further characterized by said transverse hole (64) extending through said floor (54) of said housing (46) and spaced between said alignment groove (62) and said first lateral wall (50) and adjacent to said closed end (58).

15. An assembly (10) as set forth in claim 14 further characterized by said housing (46) including a vertical receiving slot (68) extending transverse to said central axis (16) and through each of said first (50) and second (52) lateral walls for receiving said locking means (84) adjacent said open end (60).

16. An assembly (10) as set forth in claim 15 wherein said housing (46) has an external surface (74), further characterized by said housing (46) including a detent (76) disposed on said external surface (74) of said first (50) and second (52) lateral walls spaced between said vertical receiving slots (68) and said lip (66).

17. An assembly (10) as set forth in claim 1 further characterized by said locking means (84) including a U-shaped clip (86).

18. An assembly (10) as set forth in claim 17 wherein said clip (86) includes a pair of parallel vertical outer walls (88) and a crosspiece (90) extending between each of said outer walls (88) to form a generally U-shape, further characterized by a pair of inner parallel walls (92) spaced inwardly from said outer walls (88).

19. An assembly (10) as set forth in claim 18 further characterized by said clip (86) including an upper notch (98) and a lower notch (96) spaced from said upper notch (98) on each of said outer walls (88) for receiving said detent (76).

20. An assembly (10) as set forth in claim 19 further characterized by said clip (86) including a plurality of locking teeth (100) disposed on said inner walls (92) extending longitudinally of said central axis (16) and parallel to each of said upper notches (98).

21. An assembly (10) as set forth in claim 20 further characterized by each of said inner walls (92) including at least one guide (102) extending vertically from said locking teeth (100) and parallel to said lower notches (96) for guiding said first conduit section (18) in said housing receptacle (56).

22. An assembly (10) as set forth in claim 21 further characterized by a connecting rib (96) connecting each of said inner walls (92) to the corresponding said outer wall (88) and slidably disposed in each of said vertical receiving slots (68).

23. An assembly (10) as set forth in claim 22 further characterized by said housing (46) including a pair of roof slots (70) for receiving said inner wall (92).

24. An assembly (10) as set forth in claim 23 further characterized by said housing (46) including a pair of floor slots (72) adjacent and parallel to said alignment groove (62) for receiving said guide (102) of said inner wall (92).

* * * * *